United States Patent
Kono et al.

(10) Patent No.: US 9,584,408 B2
(45) Date of Patent: Feb. 28, 2017

(54) PACKET DATA EXTRACTION DEVICE, CONTROL METHOD FOR PACKET DATA EXTRACTION DEVICE, AND NON-TRANSITORY COMPUTER-READABLE RECORDING MEDIUM

(71) Applicant: Japan Science and Technology Agency, Saitama (JP)

(72) Inventors: Kenji Kono, Chiba (JP); Hiroshi Yamada, Tokyo (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 14/358,526

(22) PCT Filed: Nov. 8, 2012

(86) PCT No.: PCT/JP2012/079000
§ 371 (c)(1),
(2) Date: May 15, 2014

(87) PCT Pub. No.: WO2013/073448
PCT Pub. Date: May 23, 2013

(65) Prior Publication Data
US 2014/0314077 A1    Oct. 23, 2014

(30) Foreign Application Priority Data
Nov. 15, 2011 (JP) .................. 2011-250179

(51) Int. Cl.
*H04L 12/28* (2006.01)
*H04L 12/741* (2013.01)
*H04L 29/06* (2006.01)

(52) U.S. Cl.
CPC .......... *H04L 45/54* (2013.01); *H04L 63/1408* (2013.01); *H04L 63/1441* (2013.01)

(58) Field of Classification Search
CPC ...... G06F 21/00; H04L 63/1441; H04L 45/54
See application file for complete search history.

(56) References Cited

U.S. PATENT DOCUMENTS

| | | | | |
|---|---|---|---|---|
| 2002/0083135 A1* | 6/2002 | Koudu | ................ | G06F 12/023 709/204 |
| 2002/0095596 A1* | 7/2002 | Williams | ............ | G06F 21/6218 726/26 |

(Continued)

FOREIGN PATENT DOCUMENTS

| | | |
|---|---|---|
| CN | 1928881 A | 3/2007 |
| EP | 1182533 A2 | 2/2002 |

(Continued)

OTHER PUBLICATIONS

International Search Report issued in Application No. PCT/JP2012/079000, dated Jan. 29, 2013.

(Continued)

*Primary Examiner* — Khaled Kassim
*Assistant Examiner* — Syed S Ali
(74) *Attorney, Agent, or Firm* — Michael Best & Friedrich LLP

(57) ABSTRACT

A packet data extraction device (10) of the present invention includes: a procedure name checking section (12) for checking a procedure name of a message, which procedure name is contained in a payload of an object packet (p); and a data obtaining section (13) for obtaining target data from a payload of a target packet specified by data positional information (14b) in which a position of the target data is associated with the procedure name in advance.

6 Claims, 8 Drawing Sheets

(56) References Cited

U.S. PATENT DOCUMENTS

| | | | |
|---|---|---|---|
| 2004/0054810 A1* | 3/2004 | Furukawa | H04L 12/5692 709/249 |
| 2004/0153918 A1* | 8/2004 | Tanaka | G06F 21/14 714/724 |
| 2005/0141501 A1* | 6/2005 | Kadambi | H04L 69/161 370/389 |
| 2006/0059196 A1* | 3/2006 | Sato | G06F 17/30985 |
| 2008/0184225 A1* | 7/2008 | Fitzgerald | G06F 9/455 718/1 |
| 2008/0189769 A1 | 8/2008 | Casado et al. | |
| 2009/0262739 A1 | 10/2009 | Lu | |
| 2010/0135289 A1* | 6/2010 | Bowes | H04L 1/0072 370/389 |
| 2011/0058545 A1* | 3/2011 | Eriksson | H04L 29/12594 370/389 |
| 2012/0030740 A1* | 2/2012 | Baptist | H04L 67/1097 726/6 |
| 2012/0185856 A1 | 7/2012 | Ashihara et al. | |

FOREIGN PATENT DOCUMENTS

| | | |
|---|---|---|
| JP | 2009-049972 A | 3/2009 |
| JP | 2011-070549 A | 4/2011 |
| TW | I225218 B | 12/2004 |
| TW | 200945044 A | 11/2009 |
| WO | WO-2011/037148 A1 | 3/2011 |

OTHER PUBLICATIONS

International Preliminary Report on Patentability with Written Opinion by International Searching Authority, issued in Application No. PCT/JP2012/079000, dated Jun. 10, 2014.

Miyuki Hanaoka et al., "TCP Reassembler for Layer7-aware Network Intrusion Detection/Prevention Systems," IEICE Trans. On Information and Systems, vol. E90-D, No. 12, pp. 2019-2032, Dec. 2007.

Notice of Allowance issued in Taiwanese Application No. 101141784, dated Jun. 29, 2015.

* cited by examiner

P1. system call
P2. fault to VMM
P3. VMM emulate instruction & give control to OS
P4. OS requests and gets filesystem Info. from the server
P5. RootkitLibra gets Trusted View
P6. RootkitLibra gets Untrusted View

FIG. 5

| Procedure name | Data to be obtained |
|---|---|
| GETATTR | Inode and file size |
| SETATTR | Inode and file size |
| LOOKUP | Inode and file size |
| ACCESS | Inode and file size |
| READLINK | Inode and file size |
| READ | Inode and file size |
| WRITE | Inode and file size |
| CREAT | Inode |
| MKDIR | Inode |
| SYMLINK | Inode and file size |
| REMOVE | Inode |
| RMDIR | Inode |
| READDIR | Inode and directory entry |
| READDIRPLUS | Inode and directory entry |
| COMMIT | Inode and file size |

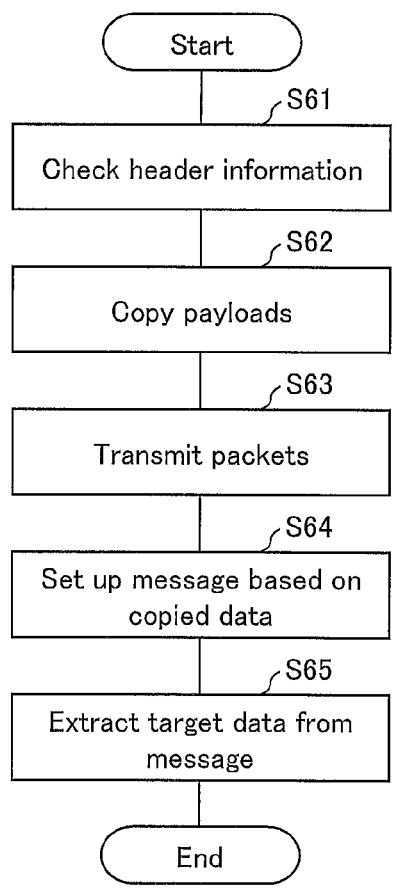

US 9,584,408 B2

PACKET DATA EXTRACTION DEVICE, CONTROL METHOD FOR PACKET DATA EXTRACTION DEVICE, AND NON-TRANSITORY COMPUTER-READABLE RECORDING MEDIUM

TECHNICAL FIELD

The present invention relates to a packet data extraction device which extracts target data from a packet in process of transmission. Further, the present invention relates to a method of controlling the packet data extraction device, a control program, and a computer-readable recording medium.

BACKGROUND ART

For example, a file metadata manipulating rootkit is a kind of computer virus. Infection by the rootkit causes a stoppage of a service and/or a leakage of information, thereby causing serious damage to a quality of the service. The file metadata manipulating rootkit alters data in a kernel of an operation system. Therefore, it is extremely difficult to detect the rootkit with the use of general antivirus software. In order to detect the rootkit, it is extremely efficient to establish a network system and then monitor a packet transmitted between virtual machine monitors. As in this example, extraction of information from a packet in process of transmission has been conducted.

Here, the following description will schematically discuss, with reference to FIG. 6, how a message is normally transmitted and received with the use of a packet.

As illustrated in FIG. 6, in a case where a message is transmitted, the following steps are carried out. That is, an application on a transmitting side (Application on a left side of FIG. 6) first creates the message (S51), and then requests an OS (Operating System) (OS on a left side of FIG. 6) to transmit the message (S52). The OS divides the message received from the application into packets and then adds headers to the respective packets (S53). Thereafter, the OS transmits the packets to an OS on a receiving side (S54).

In a case where the message is received, the following steps are carried out. That is, the OS on the receiving side (OS on a right side of FIG. 6) receives the packets (S54). The OS then removes the headers and creates the message in accordance with the headers (S55). Thereafter, the OS transmits the message thus created to an application (Application on right side of FIG. 6) (S56). The Application stores the message, received from the OS, in a memory (S57).

As described above, the OS on transmitting side converts a message into packets before transmitting the message to an NIC (Network Interface Card). In this case, the OS adds, to the respective packets, headers each including information, such as a sequence number (order) and a port number (identifier of connection), necessary for the OS on the receiving side to set up the message. The OS on the receiving side sets up the message from the packets with reference to the headers of the packets.

Next, the following description will discuss, with reference to FIGS. 7 and 8, a conventional method of extracting data from a message transmitted and received with the use of packets. Here, a case will be discussed where a VMM (Virtual Machine Monitor) extracts target data from a message.

As illustrated in FIG. 7, an OS on a transmitting side (OS on a left side of FIG. 7) transmits packets to a virtual Network Interface Card provided by a VMM. That is, the VMM receives the packets into which a message is divided by the OS. The VMM then transmits the packets thus received to an OS on a receiving side (OS on a right side of FIG. 7). Meanwhile, the VMM sets up the message based on the packets received, and then obtains target data which is desired information.

Specifically, as illustrated in FIG. 8, the VMM checks header information of each of packets received (S61), and then copies the packets except the headers (payloads) (S62). Thereafter, the VMM transmits the packets (S63). Meanwhile, the VMM sets up a message based on the copied data (S64), and then extracts the target data from the message (S65).

As described above, the VMM copies payloads of packets, and then arranges the payloads thus copied in accordance with header information of the packets. That is, the VMM extracts target data after setting up a message which has been divided into packets.

CITATION LIST

Non Patent Literature: TCP Reassembler for Layer7-aware Network Intrusion Detection/Prevention Systems, Miyuki Hanaoka, Makoto Shimamura, and Kenji Kono, IEICE Trans. on Information and Systems, Vol. E90-D, No. 12, pp. 2019-2032, December 2007

SUMMARY OF INVENTION

Technical Problem

According to the conventional method, in a case of extracting necessary information from a packet, the VMM copies payloads of packets, and then arranges the payloads thus copied in accordance with header information of the packets so as to set up a message. Thereafter, the VMM extracts desired information from the packet. That is, it is necessary to copy payloads and then set up a message. Specifically, in order to obtain target data "E", the VMM copies payloads of three packets sequentially received and then sets up a message (see FIG. 7).

The conventional method thus requires time to copy payloads. Furthermore, the conventional method causes overhead because setting up of a message is carried out also by an OS. That is, large overhead occurs when necessary information is extracted from a packet. This greatly affects a quality of a service in operation.

The present invention has been made in view of the above problems, and an object of the present invention is to realize a packet data extraction device capable of efficiently extracting necessary data from a packet, a method of controlling the packet data extraction device, a control program, and a computer-readable recording medium.

Solution to Problem

In order to attain the above object, a packet data extraction device in accordance with an embodiment of the present invention is a packet data extraction device which extracts target data from a packet which is in process of transmission, including: procedure name checking means for checking a procedure name of a message, which procedure name is contained in a payload of an object packet, with reference to the payload of the object packet stored in a temporary storing section in which the packet, which is in process of transmission, is temporarily stored; and target data obtaining means for obtaining target data from a payload of a target packet specified by data positional information indicative of a position at which the target data is stored and which is associated, in advance, with the procedure name checked by the procedure name checking means.

Further, in order to attain the above object, a method of controlling a packet data extraction device in accordance with an embodiment of the present invention is a method of controlling a packet data extraction device which extracts target data from a packet which is in process of transmission, the method including the steps of: (a) checking a procedure name of a message, which procedure name is contained in a payload of an object packet, with reference to the payload of the object packet stored in a temporary storing section in which the packet, which is in process of transmission, is temporarily stored; and (b) obtaining target data from a payload of a target packet specified by data positional information indicative of a position at which the target data is stored and which is associated, in advance, with the procedure name checked in the step (a).

Advantageous Effects of Invention

Therefore, according to a packet data extraction device and a method of controlling a packet data extraction device in accordance with an embodiment of the present invention, it is possible to efficiently obtain metadata of a file because all of packets which are communicated through a network are not converted into a message, but a packet to be converted is appropriately selected. Further, a message is not copied, unlike the conventional method. This allows an increase in processing speed. Accordingly, it is possible to efficiently extract necessary data from a packet while (i) eliminating overhead and (ii) suppressing overhead from which a service in operation suffers.

BRIEF DESCRIPTION OF DRAWINGS

FIG. 5 is an explanatory diagram illustrating an example of data positional information for use in the detecting system for a file metadata manipulating rootkit illustrated in FIG. 4.

FIG. 8 is a flowchart illustrating how the conventional method illustrated in FIG. 7 works.

DESCRIPTION OF EMBODIMENTS

The following description will discuss, in detail, an embodiment of the present invention. With reference to FIGS. 1 through 5, a packet data extraction device 10 in accordance with the present embodiment will be discussed below.

(1. Configuration of Device)

Figure 1:
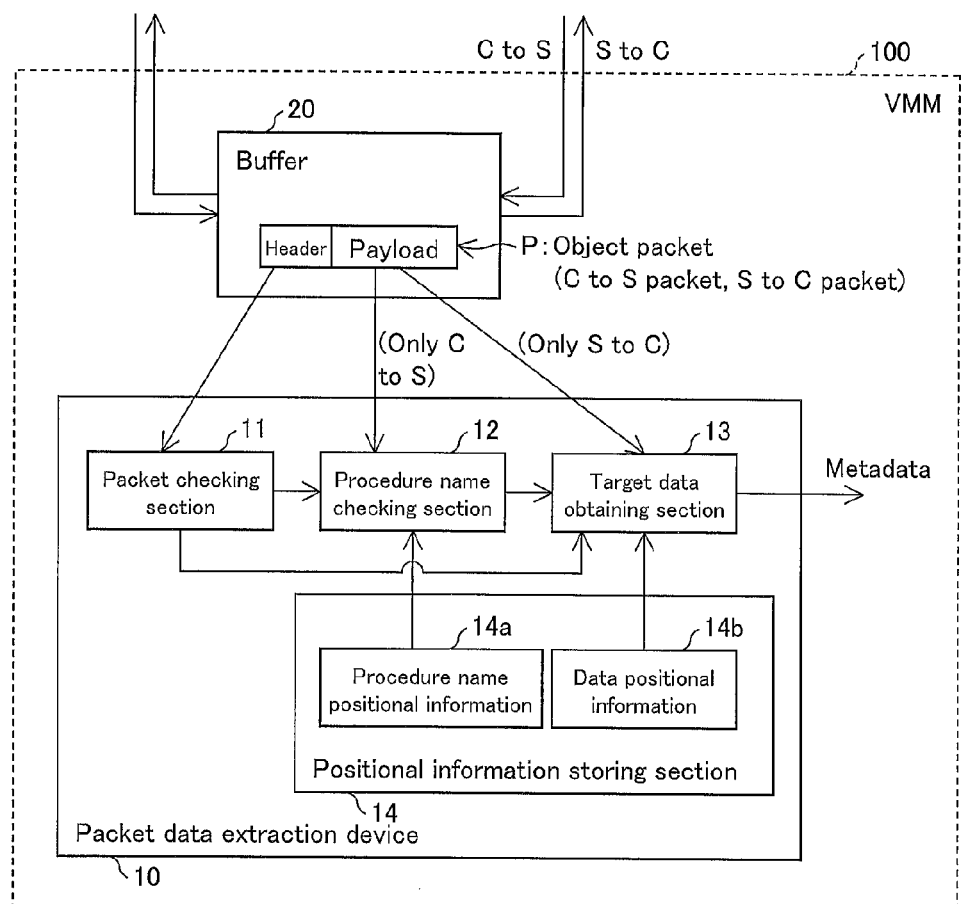
FIG. 1 is a functional block diagram illustrating, in detail, a configuration of a packet data extraction device in accordance with an embodiment of the present invention.

The following description will discuss, with reference to FIG. 1, a configuration of the packet data extraction device 10. FIG. 1 is a functional block diagram illustrating, in detail, the configuration of the packet data extraction device 10.

The packet data extraction device 10 is a device which extracts target data from a packet stored in a buffer (temporary storing section) 20 in which a packet, which is in process of transmission, is temporarily stored. The present embodiment assumes that the packet data extraction device 10 is provided in a VMM (Virtual Machine Monitor) 100. Note here that the packet data extraction device 10 can be provided in a device on a packet transmitting side so as to serve as a lower layer of an application which transmits a packet. Alternatively, the packet data extraction device 10 can be provided in a device on a packet receiving side so as to serve as a lower layer of an application which receives a packet. Alternatively, the packet data extraction device 10 can be provided on a network via which the device on the packet transmitting side and the device on the packet receiving side are connected to each other.

Figure 2:
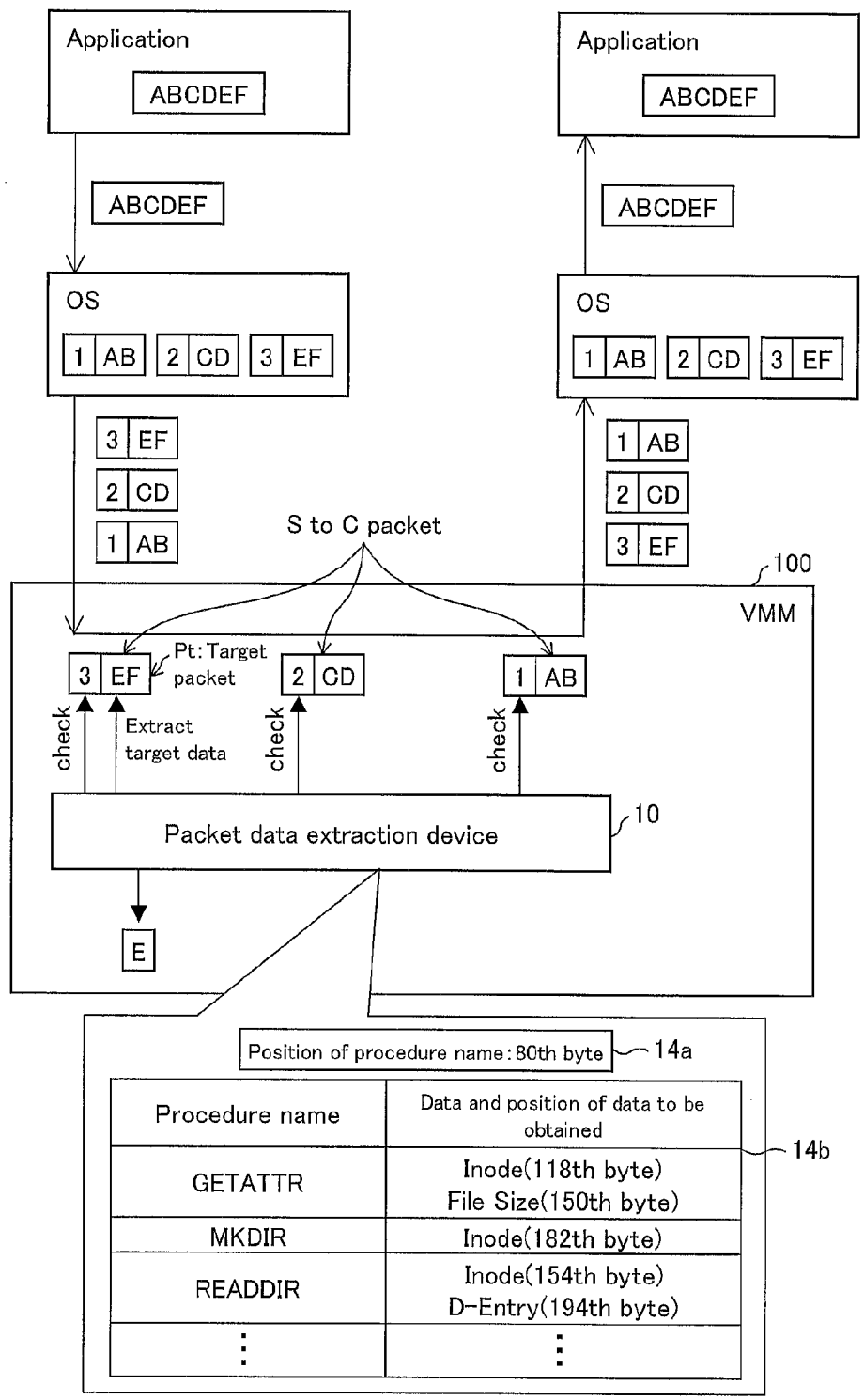
FIG. 2 is a view schematically illustrating how the packet data extraction device illustrated in FIG. 1 operates.

The present embodiment will discuss an example case where the packet data extraction device 10 is applied to a communication between a server and a client. In FIG. 2 (as well as FIG. 1), an Application on a left side is a server, and an Application on a right side is a client. The client transmits a request message to the server. The server transmits a data message to the client in response to the request message received from the client. Note here that, according to the present embodiment, a message, in which a request from the client to the server is described, is referred to as a "C to S message", and packets, into which the "C to S message" is divided, are referred to as "C to S packets". Note also that a data message, transmitted from the server in response to a request message, is referred to as an "S to C message", and packets, into which the "S to C message" is divided, are referred to as "S to C packets".

Specifically, the packet data extraction device 10 includes a packet checking section (packet checking means) 11, a procedure name checking section (procedure name checking means) 12, a target data obtaining section (target data obtaining means) 13, and a positional information storing section 14 (see FIG. 1).

The packet checking section 11 checks, by checking a header of an object packet P, whether or not the object packet P contains a headmost part of a message. That is, the packet checking section 11 detects a head packet Ph containing the headmost part of the message. Specifically, the packet checking section 11 detects object packets P (C to S packets) into which a C to S message is divided, and then checks a header of each of the object packets P thus detected so as to check whether or not the each of the object packets P contains the headmost part of the C to S message.

The packet checking section 11 also detects object packets P (S to C packets) into which an S to C message in response to the C to S message is divided, with reference to data positional information 14b (described later) indicative of a position at which target data is stored and which is associated, in advance, with a procedure name checked by the procedure name checking section 12. The packet checking section 11 then checks a header of each of the object packets P thus detected so as to detect a target packet Pt specified by the data positional information 14b. That is, the packet checking section 11 detects a target packet Pt containing target data.

The procedure name checking section 12 refers to a payload of an object packet P (C to S packet) stored in a buffer 20 with reference to procedure name positional information 14a (described later) indicative of a position at which a procedure name of a message is stored. The procedure name checking section 12 then checks the procedure name of the C to S message, which procedure name is contained in the payload of the object packet P. Note that a procedure name is used in the present embodiment. The present embodiment is, however, not limited to this. Alternative information, such as ID numbers each uniquely assigned to a corresponding procedure, can be used, provided that a procedure of a message can be identified.

Note that the present embodiment assumes that, only in a case where the packet checking section 11 checks that an object packet P (C to S packet) contains the headmost part of a C to S message, the procedure name checking section 12 checks a procedure name of the C to S message, which procedure name is contained in a payload of the object packet P (C to S packet). Normally, a procedure name of a C to S message is contained in the headmost part of the C to S message. It follows that the procedure name is contained in the headmost one of a plurality of C to S packets into which the C to S message is divided. Therefore, in order to detect a C to S packet containing the procedure name, which is contained in the C to S message, it is only necessary to determine whether or not a C to S packet is a head packet Ph containing the headmost part of the C to S message with reference to a header of the C to S packet. It follows that, in a case where the C to S packet is one that does not contain the headmost part of the C to S message with reference to the header of the C to S packet, subsequent processes can be omitted. The procedure name checking section 12 is capable of detecting a C to S packet containing a procedure name of a C to S message only by thus referring to a header of a C to S packet. Efficiency can be therefore achieved.

Out of S to C packets into which an S to C message in response to a C to S message is divided, the target data obtaining section 13 obtains target data from a payload of a target packet Pt specified by the data positional information 14b (described later) indicative of a position at which the target data is stored and which is associated, in advance, with a procedure name checked by the procedure name checking section 12. Note that the present embodiment assumes that the target data obtaining section 13 obtains only data located at a position specified by the data positional information 14b. Note also that, in a case where the target data obtaining section 13 obtains target data from a payload of a target packet Pt, the target data obtaining section 13 makes a conversion with respect to a message from a head of the payload and then stops such a conversion at a time when the target data is obtained.

In the positional information storing section 14, the procedure name positional information 14a and the data positional information 14b are stored in advance.

The procedure name positional information 14a indicates a position, in a C to S message, at which a procedure name of the C to S message is stored. Note that the present embodiment assumes that a position, in a C to S message, at which a procedure name is stored is determined depending on a protocol of the message. A single position is common among procedures in a case of identical protocols.

The data positional information 14b is information in which a procedure name of a procedure is associated with (i) a data name of data (target data) obtained from an S to C message in response to the procedure and (ii) a position, in the S to C message, at which the data (target data) is stored.

That is, by referring to the data positional information 14b, the following (i) and (ii) are identified: (i) a data name of target data; and (ii) a position, in an S to C message, at which the target data is stored, both of which are associated with a procedure name.

(2. Positional Information)

The following description will discuss, with reference to a specific example illustrated in FIG. 2, two types of positional information (procedure name positional information 14a and data positional information 14b) which are stored in advance in the positional information storing section 14 of the packet data extraction device 10. FIG. 2 is a view schematically illustrating how the packet data extraction device 10 operates. Note that the following description will discuss an example case where a protocol of a message is an NFS (Network File System) protocol and file metadata is extracted. FIG. 2 illustrates how the packet data extraction device 10 processes S to C packets into which an S to C message is divided in response to a C to S message transmitted by the client. Note that, although FIG. 2 does not illustrate a process in which the packet data extraction device 10 processes the C to S message transmitted by the client, such a process can be understood from FIG. 2 and a later-described operation.

As has been described, the packet data extraction device 10 is configured such that the procedure name positional information 14a and the data positional information 14b are stored, in advance, in the positional information storing section 14.

The procedure name positional information 14a is information indicative of a position of a procedure name (for example, "from the first byte of a message"). That is, the procedure name positional information 14a indicates where the procedure name is located in a message. Specifically, the procedure name positional information 14a is described as, for example, "position of procedure name: 80th byte" (see FIG. 2).

Note here that, according to the NFS protocol, a position, in a message, at which a procedure name is stored is already determined. The procedure name checking section 12 is therefore capable of extracting a procedure name, by referring to a payload of a packet with reference to the procedure name positional information 14a. That is, it is not necessary to scan all of packets in order to extract such a procedure name.

The data positional information 14b is information in which a procedure name is associated with a data name and a position of data to be obtained. That is, the data positional information 14b indicates, for each procedure name, which data is extracted from which position. Specifically, according to the example of FIG. 2, such information is obtained that "in a case of GEATTR, Inode is stored at 118th byte and File Size is stored at 150th byte".

Note here that, in a case of the NFS protocol, (i) data contained in a message and (ii) a position of the data are already determined for each procedure. That is, data contained in a message and a position of the data differ from procedure to procedure. Therefore, the target data obtaining section 13 is capable of extracting data, by referring to a payload with reference to the data positional information 14b. That is, it is not necessary to set up a whole message based on payloads in order to extract target data.

Note also that a header of a packet includes a packet size and a sequence number. Therefore, it is possible to understand, from a packet size and a sequence number of each packet, that data of a payload of the each packet corresponds to which part of a message that has not yet been divided into the packets. This allows the packet checking section 11 to detect a target packet Pt containing target data.

In a case where file metadata is extracted from a message which is created in conformity with the NFS protocol, it is possible not to cause a packet of a message in response to an unnecessary procedure to be processed by registering, in the data positional information 14b, only a procedure involving file metadata. Note that, according to the NFS protocol, 15 types of procedures, out of 22 types of procedures in total, are each a procedure involving file metadata. Each of the 15 types of procedures has a message whose length allows the message to be transmitted with the use of a single packet. That is, in a case where those 15 types of procedures are subjected to the extraction of file metadata, file metadata (target data) is always contained in a head packet Ph.

(3. Operation)

Figure 3:
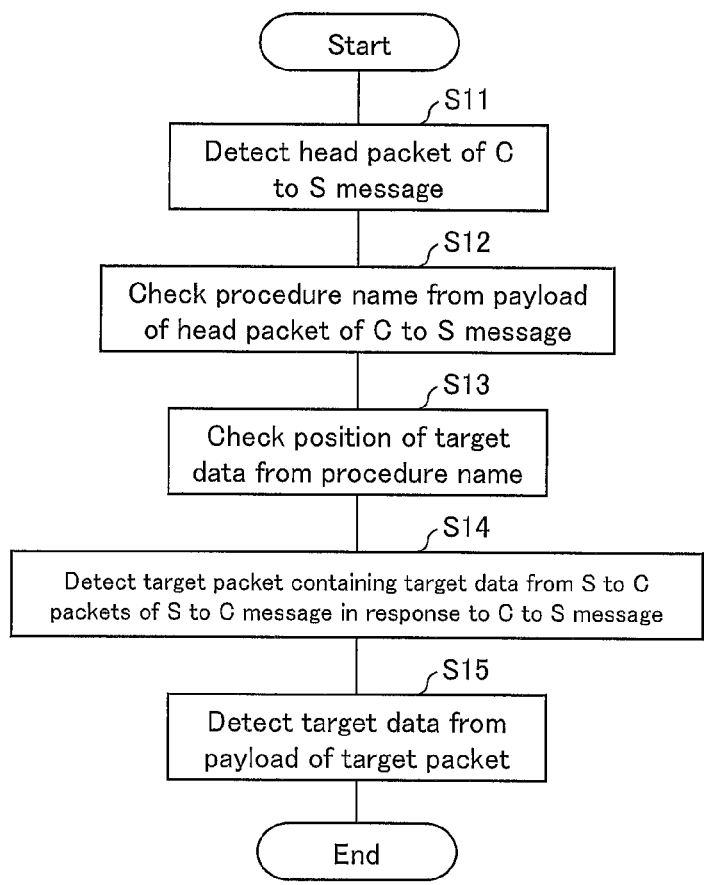
FIG. 3 is a flowchart illustrating how the packet data extraction device illustrated in FIG. 1 processes.

Next, the following description will discuss, with reference to FIG. 3, how the packet data extraction device 10 processes. FIG. 3 is a flowchart illustrating how the packet data extraction device 10 processes.

Packets, each of which is in process of transmission and which are to pass through the VMM 100, are sequentially and temporarily stored in the buffer 20. Note that a packet, which is stored in the buffer 20 and which is being processed by the packet data extraction device 10, is referred to as an object packet P.

The packet data extraction device 10 carries out the following process while sequentially detecting object packets stored in the buffer 20.

First, the packet checking section 11 detects, by sequentially checking headers of the object packets P (C to S packets) stored in the buffer 20, a head packet Ph of a C to S message which head packet Ph contains the headmost part of the C to S message (S11; head packet checking step).

Next, the procedure name checking section 12 checks, with reference to the procedure name positional information 14a, a procedure name of the C to S message from a payload of the head packet Ph which is detected in the step S11 (S12; procedure name checking step).

The target data obtaining section 13 then obtains, from the positional information storing section 14, the data positional information 14b in which the procedure name checked in the step S12 is associated with a data name and a position of data in advance (S13; data positional information obtaining step).

Next, the packet checking section 11 detects, with reference to the data positional information 14b obtained in the step S13, S to C packets into which an S to C message is divided in response to the C to S message. The packet checking section 11 then detects, from the S to C packets thus detected, a target packet Pt containing data located at a position (position of a target packet Pt) specified by the data positional information 14b (S14; target packet checking step).

In a case where the position indicated by the data positional information 14b is located at part of the S to C message which part is contained in the payload of the head packet Ph of the S to C message, the head packet Ph of the S to C message is the target packet Pt. Similarly, in a case where the position indicated by the data positional information 14b is located at part of the S to C message which part is contained in a payload of the third S to C packet, the third packet is the target packet Pt (see FIG. 2). In this case, the packet checking section 11 sequentially checks headers of the respective second and third S to C packets, and then detects the third S to C packet as the target packet Pt.

Finally, the target data obtaining section 13 obtains target data from a payload of the target packet Pt which has been detected in the step S14 (S 15; target data obtaining step).

(4. Summary)

As has been described, in a software layer referred to as a virtual machine monitor, the packet data extraction device 10 is capable of efficiently extracting, by a packet unit, metadata of a message file which is created in conformity with a network file system protocol. That is, the packet data extraction device 10 is capable of efficiently obtaining metadata of a message file, not by converting to a message all of packets which are communicated through a network, but by appropriately selecting a packet to be converted. Specifically, the packet data extraction device 10 does not copy an S to C message, unlike the conventional device. This allows an increase in processing speed. Since the S to C message is not set up, it is possible to (i) eliminate overhead and (ii) suppress overhead from which a service in operation suffers.

Note that the present embodiment has described the NFS protocol as an example. However, the present invention is not limited to the NFS protocol. Any protocol can be employed, provided that it is a protocol in which a procedure is transmitted and a file is operated, like the NFS protocol or a position, in a message, of target data is specified in advance for each procedure. Specific examples of the applicable protocol include, other than the NFS protocol, an FTP (File Transfer Protocol) protocol and an HTTP (Hyper Text Transfer Protocol).

(5. Example Applications)

The following description will discuss example applications of the packet data extraction device 10.

(5.1. Detection of Rootkit)

A file metadata manipulating rootkit is a kind of computer virus. Infection by the rootkit causes a stoppage of a service and/or a leakage of information, thereby causing serious damage to a quality of the service. The file metadata manipulating rootkit alters data in a kernel of an operation system. Therefore, it is extremely difficult to detect the rootkit with the use of general antivirus software. Note here that a VMWatcher detects a known file metadata manipulating rootkit. However, the VMWatcher is not effective for an unknown file metadata manipulating rootkit. A Strider Ghostbuster is capable of detecting an unknown file metadata manipulating rootkit. However, the Strider Ghostbuster greatly affects a quality of a service in operation.

A stoppage of a service or a leakage of information caused by the file metadata manipulating rootkit is serious for a provider of the service. It is therefore necessary to monitor whether a system is infected by the file metadata manipulating rootkit. In order to detect the file metadata manipulating rootkit, it is extremely efficient to establish a network system and then monitor a packet transmitted between virtual machine monitors. Note, however, that it is also necessary to suppress, as much as possible, overhead from which a service in operation suffers.

In view of the circumstances, by incorporating the foregoing packet data extraction device 10 into a mechanism for detecting the file metadata manipulating rootkit, it is possible to monitor the rootkit while suppressing overhead from which an application or an operating system, which operates in a virtual machine, suffers.

Figure 4:
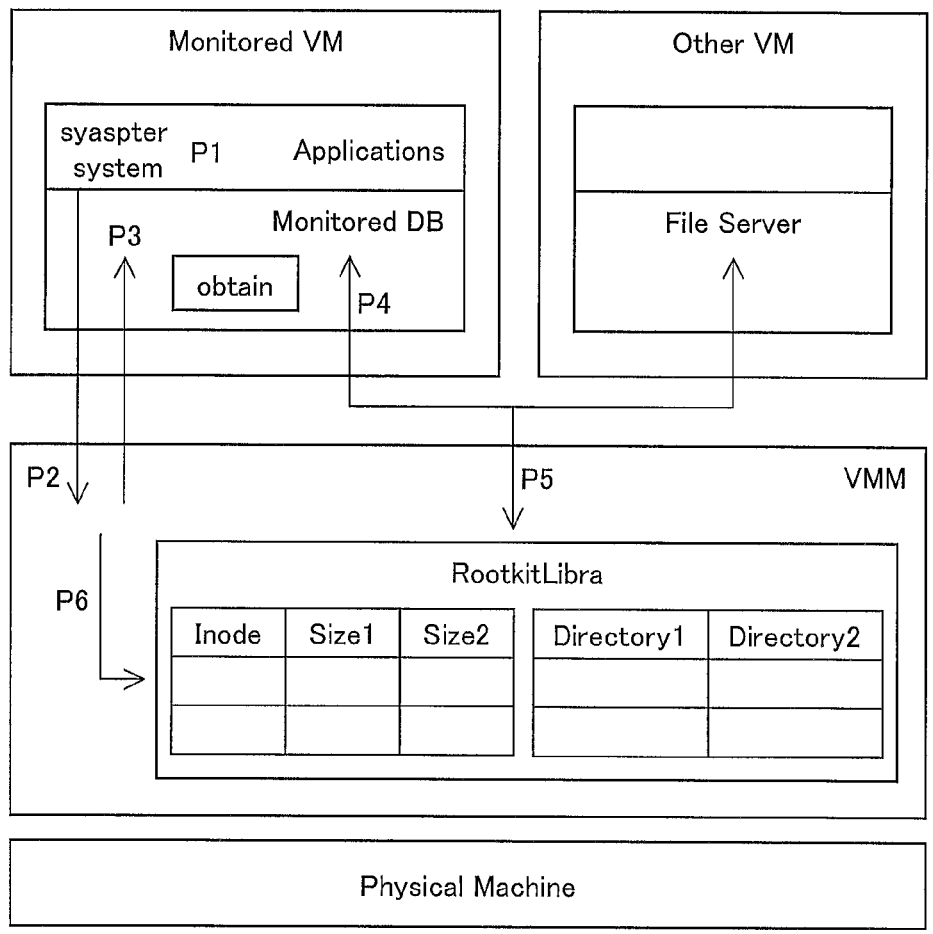
FIG. 4 is a block diagram schematically illustrating a detecting system for a file metadata manipulating rootkit which system employs the packet data extraction device illustrated in FIG. 1.
Figure 6:
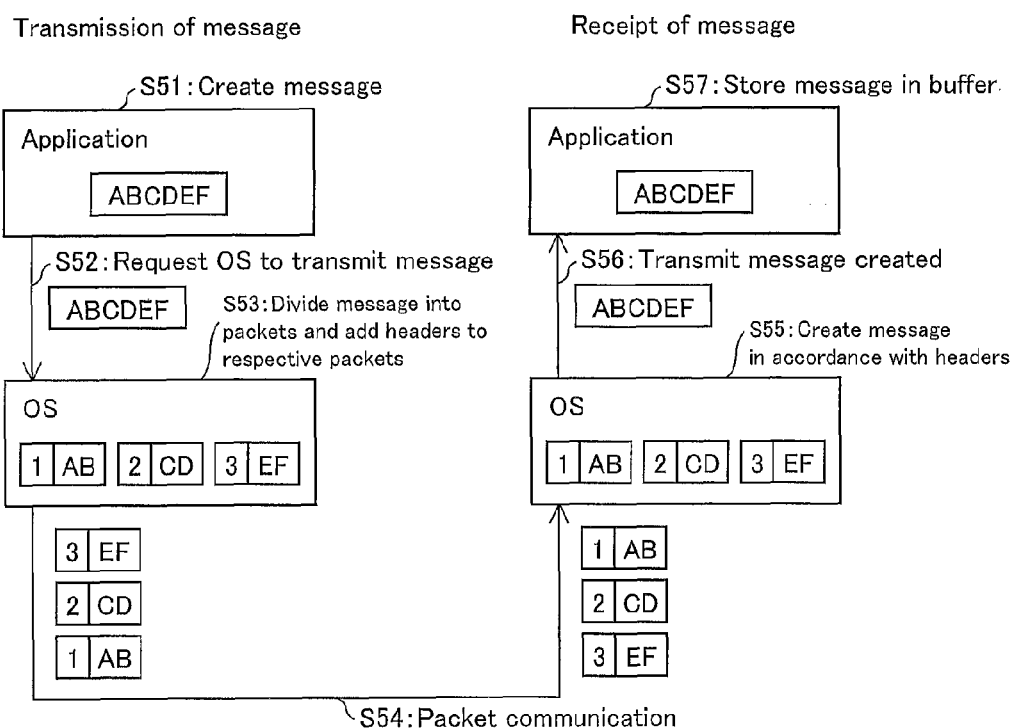
FIG. 6 is an explanatory diagram schematically illustrating how a message is conventionally transmitted and received with the use of packets.
Figure 7:
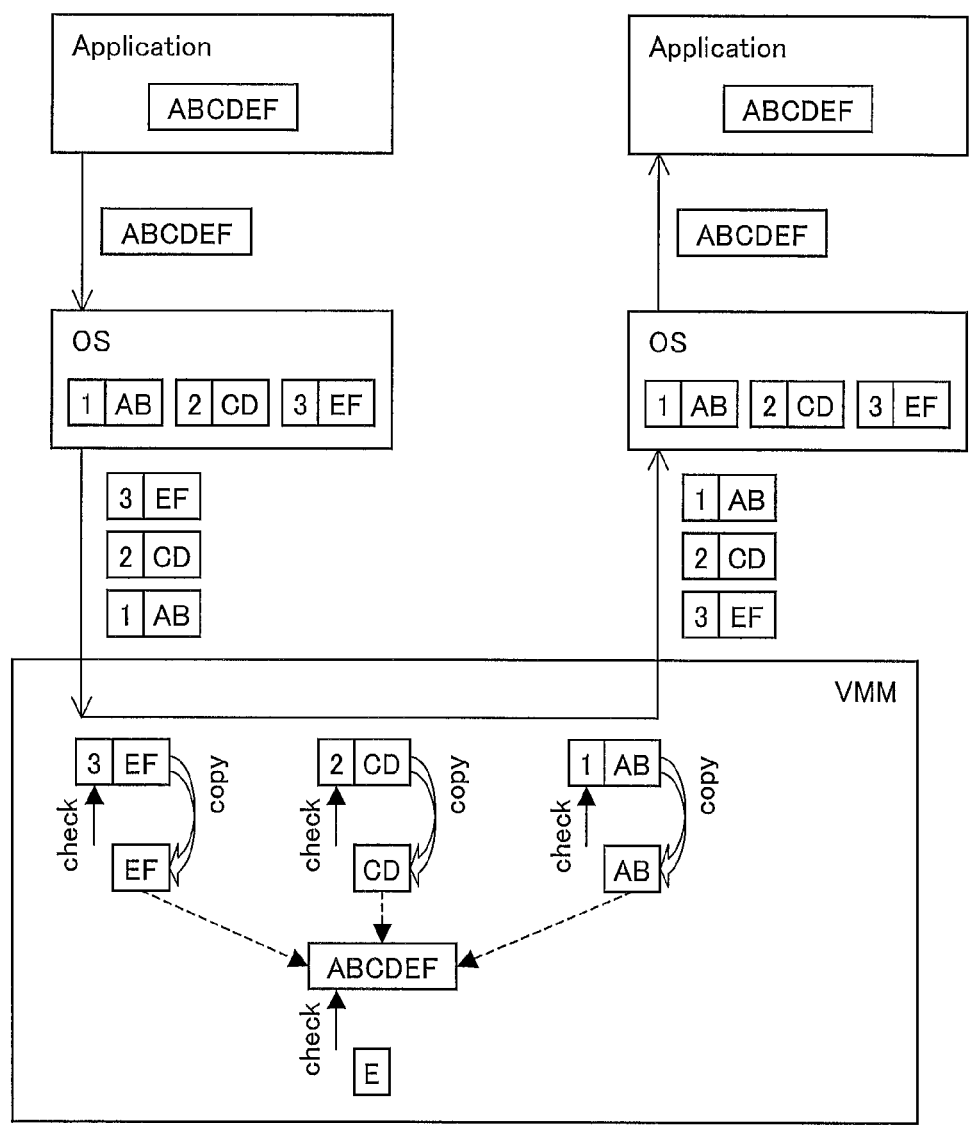
FIG. 7 is a view schematically illustrating a conventional method of extracting data from a message transmitted and received with the use of packets.

FIG. 4 is a block diagram schematically illustrating a detecting system for a file metadata manipulating rootkit which system employs the packet data extraction device 10. FIG. 5 is an explanatory diagram illustrating an example of data positional information for use in the detecting system for a file metadata manipulating rootkit. FIG. 5 illustrates, out of procedures of the NFS protocol, 15 types of procedures each involving file metadata.

The packet data extraction device 10 is incorporated into a VMM illustrated in FIG. 4 in order to extract, from a packet, metadata of a received file. An application compares (i) a content of the file metadata extracted from the packet by the packet data extraction device 10 with (ii) file metadata obtained by an OS. In a case where those two sets of file metadata do not match each other, it is possible to determine that the OS is infected by the file metadata manipulating rootkit.

Specifically, a VM view obtains an argument and a return value (for example, stat( ), fstat( ), getdent( )) of a system call which relates to a file system. Meanwhile, a VMM View (packet data extraction device 10) obtains file metadata from a message outputted from a network file system NFS. In a case where a view generated by the VM view is different from that generated by the VMM View as a result of comparison, it is determined that the OS is infected by the rootkit.

By thus incorporating the packet data extraction device 10 into a mechanism for detecting the file metadata manipulating rootkit, it is possible to monitor the rootkit while suppressing overhead from which an application or an OS, which operates in a virtual machine, suffers. This allows for a great contribution to prevention of damage, such as a stoppage of a service and/or a leakage of information, caused by the rootkit.

(5.2. File Access Monitor)

According to the packet data extraction device 10, since the VMM 100 monitors an NFS protocol, it can obtain the number of access to a file or an access pattern without altering an OS or an application. Therefore, the packet data extraction device 10 is effective in optimization or redundancy of file arrangement. Specifically, it is possible to (i) reduce disk access by arranging, in an identical directory, a group of files which are accessed at similar timings or (ii) carry out load sharing by making a copy of a file which is often accessed.

(5.3. File Access Control)

The packet data extraction device 10 is capable of controlling access to a file without changing a setting of an OS or an application. This makes it possible to avoid a manipulation of a file. That is, even in a case where an OS is infected by a virus, no access is allowed to a file which is set not to be accessed, because the VMM is not infected by the virus.

(6. Supplementary Note)

Finally, each block of the packet data extraction device 10, the packet checking section 11, the procedure name checking section 12, and the data obtaining section 13 can be implemented by hardware logic or can be alternatively implemented by software with the use of a CPU.

In the latter case, the packet data extraction device 10 includes: a CPU (Central Processing Unit) that executes instructions of a program that carries out the foregoing functions; a ROM (Read Only Memory) or a storage device (each referred to as a "recording medium") that stores the program and various sets of data; and a RAM (Random Access Memory) in which the program is loaded. The object of the present invention can be attained by (i) supplying, to the packet data extraction device 10, the recoding medium in which program codes (an executable program, an intermediate code program, and a source program) of a program for controlling the packet data extraction device 10, which is software that executes the foregoing functions, are computer-readably recorded and (ii) causing a computer (or a CPU or an MPU) of the packet data extraction device 10 to read and execute the program codes recorded in the recording medium.

Examples of the recording medium includes: (i) tapes such as a magnetic tape and a cassette tape; (ii) disks including magnetic disks, such as a Floppy® disk and a hard disk, and optical disks, such as a CD-ROM, an MO, an MD, a DVD, and a CD-R; (iii) cards such as an IC card (including a memory card) and an optical card; and (iv) semiconductor memories such as a mask ROM, EPROM, EEPROM (Registered Trademark), and a flash ROM.

Further, the packet data extraction device 10 can be connected to a communication network so that the program codes are supplied to the packet data extraction device 10 via the communication network. This communication network is not limited to any particular one. Examples of the communication network include the Internet, an intranet, an extranet, a LAN, ISDN, VAN, a CATV communications network, a virtual private network, a telephone network, a mobile telecommunications network, and a satellite communication network. Further, a transmission medium by which the communication network is constituted is not limited to any particular one. Examples of the transmission medium include: wired transmission media such as IEEE 1394, a USB, a power-line carrier, a cable TV circuit, a telephone line, and ADSL; and wireless transmission media such as infrared communication systems such as IrDA and a remote control, Bluetooth (Registered Trademark), 802.11 wireless communication system, HDR, a mobile phone network, a satellite circuit, and a digital terrestrial network. Note that the present invention can also be implemented by the program in the form of a computer data signal embedded in a carrier wave which is embodied by electronic transmission.

The present invention is not limited to the description of the embodiment above, but may be altered by a skilled person within the scope of the claims. An embodiment derived from a proper combination of technical means disclosed in different embodiments is also encompassed in the technical scope of the present invention.

As has been described, a packet data extraction device in accordance with the present invention is a packet data extraction device which extracts target data from a packet which is in process of transmission, including: procedure name checking means for checking a procedure name of a message, which procedure name is contained in a payload of an object packet, with reference to the payload of the object packet stored in a temporary storing section in which the packet, which is in process of transmission, is temporarily stored; and target data obtaining means for obtaining target data from a payload of a target packet specified by data positional information indicative of a position at which the target data is stored and which is associated, in advance, with the procedure name checked by the procedure name checking means.

Further, a method of controlling a packet data extraction device in accordance with the present invention is a method of controlling a packet data extraction device which extracts target data from a packet which is in process of transmission, the method including the steps of: (a) checking a procedure name of a message, which procedure name is contained in a payload of an object packet, with reference to the payload of the object packet stored in a temporary storing section in which the packet, which is in process of transmission, is temporarily stored; and (b) obtaining target data from a payload of a target packet specified by data positional information indicative of a position at which the target data is stored and which is associated, in advance, with the procedure name checked in the step (a).

According to the above configuration, a procedure name of a message, which procedure name is contained in a payload of an object packet, is checked, and then target data is obtained from a payload of a target packet specified by data positional information indicative of a position at which the target data is stored and which is associated with the procedure name in advance.

Therefore, in a case where a procedure name is identified with reference to the data positional information, it is possible to specify a target packet containing target data. Accordingly, after the procedure name is checked, it is only necessary to detect the target packet and then obtain the target data from a payload of the target packet.

As described above, since all of packets which are communicated through a network are not converted into a message but a packet to be converted is appropriately selected, it is possible to efficiently obtain metadata of a file. Further, the message is not copied, unlike the conventional method. This allows an increase in processing speed. It is therefore possible to efficiently extract necessary data from a packet while (i) eliminating overhead and (ii) suppressing overhead from which a service in operation suffers.

Further, the packet data extraction device in accordance with the present invention further includes: packet checking means for checking whether or not the object packet is a packet containing a headmost part of the message, only in a case where the packet checking means checks that the object packet contains the headmost part of the message, the procedure name checking means checking the procedure name of the message, which procedure name is contained in the payload of the object packet.

According to the above configuration, only in a case where it is checked that an object packet contains the headmost part of a message, a procedure name of the message, which procedure name is contained in the payload of the object packet, is checked.

Normally, a procedure name of a message is contained in the headmost part of the message. It follows that the procedure name is contained in the headmost one of a plurality of packets into which the message is divided. Therefore, in order to detect a packet containing the procedure name of the message, it is only necessary to determine whether or not a packet is a head packet containing the headmost part of the message with reference to a header of the packet. It follows that, in a case where the packet is one that does not contain the headmost part of the message, subsequent processes can be omitted. It is thus possible to efficiently detect a packet containing a procedure name of a message.

Further, the packet data extraction device in accordance with the present invention is arranged such that the target data obtaining means obtains, as the target data, only data located at the position specified by the data positional information.

According to the above configuration, since the data positional information indicates a position of target data, it is possible to obtain the target data by obtaining data located at the position specified by the data positional information. Thus, it is possible to efficiently extract necessary data from a packet by obtaining only data located at a position specified by the data positional information.

Further, the packet data extraction device in accordance with the present invention is arranged such that the packet data extraction device is provided in a VMM.

According to the above configuration, the packet data extraction device is provided in the VMM. It is therefore possible to obtain file metadata and monitor a protocol without altering an OS or an application. This allows the packet data extraction device to be applied to various techniques.

Note that the packet data extraction device can be realized by a computer. In this case, the scope of the present invention also encompasses (i) a controlling program for causing a computer to operate as each means of the packet data extraction device and (ii) a computer-readable recording medium in which the controlling program is recorded.

INDUSTRIAL APPLICABILITY

The packet data extraction device of the present invention is capable of extracting necessary data from a packet while suppressing, as much as possible, overhead from which a service in operation suffers. Therefore, the packet data extraction device can be employed for detection of a rootkit, which manipulates file metadata, file access monitor, file access control, or the like.

REFERENCE SIGNS LIST

10 Packet data extraction device (packet data extraction device)
11 Packet checking section (packet checking means)
12 Procedure name checking section (procedure name checking means)
13 Target data obtaining section (target data obtaining means)
14b Data positional information
20 Buffer (temporary storing section)
100 VMM
P Object packet
S11 Head packet checking step
S12 Procedure name checking step
S13 Data positional information obtaining step
S14 Target packet checking step
S15 Target data obtaining step

The invention claimed is:

1. A packet data extraction device that includes a processor and a memory, the packet data extraction device extracts target data from a packet which is in process of transmission in a case where a message is transmitted as a plurality of packets, the packet data extraction device comprising:
a packet checking section that uses a procedure name of the message to electronically identify an object packet in an object payload, the packet checking section is configured to use data positional information to electronically identify a target packet in a target payload; a procedure name checking section that electronically extracts the procedure name of the message from the object packet, which the procedure name is contained in an object payload of the object packet, with reference to the object payload of the object packet stored in a temporary storing section in which the object packet, which is included in the plurality of packets and is in process of transmission, is temporarily stored;
a positional information storing section that electronically stores the procedure name and the data positional information to associate the procedure name with the data positional information, the data positional information being indicative of a position at which the target data in the message is stored; and a target data obtaining section for obtaining the target data from the target payload of the target packet which is included in the plurality of packets and is specified by the data positional information indicative of a position at which the target data is stored and which is associated, in the positional information storing section, with the procedure name checked by the procedure name checking section.

2. A packet data extraction device as set forth in claim 1, wherein the packet checking section is configured to check whether or not the object packet is a packet containing a headmost part of the message as the object payload, only in a case where the packet checking section checks that the object packet contains the headmost part of the message, the procedure name checking section checking the procedure name of the message, which procedure name is contained in the object payload of the object packet.

3. The packet data extraction device as set forth in claim 1, wherein the target data obtaining section obtains only data located at the position specified by the data positional information.

4. The packet data extraction device as set forth in claim 1, wherein the packet data extraction device is provided in a Virtual Machine Monitor (VMM).

5. A method of controlling a packet data extraction device which extracts target data from a packet which is in process of transmission in a case where a message is transmitted as a plurality of packets, the packet data extraction device including a positional information storing section in which a procedure name and data positional information are stored so that the procedure name and the data positional information are associated with each other in advance, the data positional information being indicative of a position at which the target data in the message is stored, the method comprising the steps of:
(a) electronically identifying an object packet, a packet checking section uses the procedure name of the message to electronically identify the object packet;
(b) electronically identifying a target packet, the packet checking section uses data positional information to electronically identify the target packet;
(c) checking a procedure name of the message, which the procedure name is contained in an object payload of the object packet, with reference to the payload of the object packet stored in a temporary storing section in which the packet, which is included in the plurality of packets and is in process of transmission, is temporarily stored; and
(d) obtaining the target data from a target payload of the target packet which is included in the plurality of packets and is specified by the data positional information indicative of a position at which the target data is stored and which is associated, in the positional information storing section, with the procedure name checked in the step (c).

6. A non-transitory computer-readable recording medium in which a control program is recorded, the control program causing a computer to perform the method as set forth in claim 5.

* * * * *

UNITED STATES PATENT AND TRADEMARK OFFICE
CERTIFICATE OF CORRECTION

PATENT NO.         : 9,584,408 B2
APPLICATION NO.    : 14/358526
DATED              : February 28, 2017
INVENTOR(S)        : Kenji Kono It is certified that error appears in the above-identified patent and that said Letters Patent is hereby corrected as shown below:

In the Specification

In Column 12, Line 53:
Please delete "in an object payload"

In Column 12, Line 53:
Please delete "in a target payload"

In the Claims

Beginning at Column 13, Line 26, please replace Claim 5 with:
--A method of controlling a packet data extraction device that includes a processor and a memory, the packet data extraction device extracts target data from a packet which is in process of transmission in a case where a message is transmitted as a plurality of packets, the method comprising:
    a packet checking step of using a procedure name of the message to electronically identify an object packet, a packet checking section uses data positional information to electronically identify a target packet;
    a procedure name checking step of electronically extracting the procedure name of the message from the object packet, which the procedure name is contained in an object payload of the object packet, with reference to the object payload of the object packet stored in a temporary storing section in which the object packet, which is included in the plurality of packets and is in process of transmission, is temporarily stored;
    a positional information storing step of electronically storing the procedure name and the data positional information to associate the procedure name with the data positional information, the data positional information being indicative of a position at which the target data in the message is stored; and
    a target data obtaining step of obtaining the target data from a target payload of the target packet which is included in the plurality of packets and is specified by the data positional information Signed and Sealed this
Sixth Day of June, 2017

Michelle K. Lee
*Director of the United States Patent and Trademark Office*

CERTIFICATE OF CORRECTION (continued)
U.S. Pat. No. 9,584,408 B2 indicative of a position at which the target data is stored and which is associated, in a positional information storing section, with the procedure name checked by a procedure name checking section.--